United States Patent [19]

Baas

[11] Patent Number: 4,847,821
[45] Date of Patent: Jul. 11, 1989

[54] PROCESS FOR SEARCHING FOR A TRACK ON A ROTATING PLATE-LIKE INFORMATION SUPPORT AND CIRCUIT FOR PERFORMING THE PROCESS

[75] Inventor: Dieter Baas, Kehl, Fed. Rep. of Germany

[73] Assignee: Deutsche Thomson-Brandt GmbH, Villingen, Fed. Rep. of Germany

[21] Appl. No.: 138,519
[22] PCT Filed: Dec. 4, 1986
[86] PCT No.: PCT/EP86/00709
§ 371 Date: Aug. 24, 1987
§ 102(e) Date: Aug. 24, 1987
[87] PCT Pub. No.: WO87/03731
PCT Pub. Date: Jun. 18, 1987

[30] Foreign Application Priority Data
Dec. 10, 1985 [DE] Fed. Rep. of Germany ....... 3543568

[51] Int. Cl.$^4$ ............................................. G11B 17/22
[52] U.S. Cl. ......................................... 369/32; 369/44
[58] Field of Search ........................ 369/32, 44, 45, 46

[56] References Cited

U.S. PATENT DOCUMENTS

| | | | |
|---|---|---|---|
| 3,906,326 | 9/1975 | Chur | 360/106 X |
| 4,236,232 | 11/1980 | Jansen et al. | 369/44 X |
| 4,397,009 | 8/1983 | Eriksson | 369/32 |
| 4,561,081 | 12/1985 | Janssen et al. | 369/46 X |
| 4,745,587 | 5/1988 | Maeda et al. | 369/44 X |

FOREIGN PATENT DOCUMENTS 0090379 10/1983 European Pat. Off. .
0149888 7/1985 European Pat. Off. .

Primary Examiner—Eugene R. LaRoche
Assistant Examiner—Seung Ham
Attorney, Agent, or Firm—Max Fogiel

[57] ABSTRACT

A writing and/or reading head can write and/or read data on the tracks of an information support. The writing and/or reading head can be positioned over each track of the information support by means of a coarse-feed drive (S, G) and by a fine-feed drive (S, F) which is mechanically linked with the coarse-feed drive. When searching for a track, the coarse-feed drive travels fast over the tracks until it stops at the target track. The braking phase of the coarse-feed drive is kept short by a large time-log. At the latest at the beginning of the braking phase of the coarse-feed drive the regulating circuit of the fine-feed drive is disconnected. During the braking phase a control signal is applied to the fine-feed drive which clamps the mechanical oscillations of the fine-feed drive as a result of the inertial forces which arise when the coarse-feed drive is braked. Consequently, after braking of the coarse-feed drive, the regulating circuit of the fine-feed drive can again be connected. The fine-feed drive is then brought precisely over the track sought.

6 Claims, 3 Drawing Sheets

PROCESS FOR SEARCHING FOR A TRACK ON A ROTATING PLATE-LIKE INFORMATION SUPPORT AND CIRCUIT FOR PERFORMING THE PROCESS

BACKGROUND OF THE INVENTION

The invention concerns a method of searching for a track on a rotating disk-like data carrier with tracks that data can be written into and/or read out of by means of a read-and-write head that can be positioned over any track on the data carrier by means of a controlled coarse drive mechanism and of a controlled fine drive mechanism that is mechanically connected to the coarse drive mechanism.

Rotating data carriers that can be read with a reading head provided with an optical system for reading data are employed for example in CD players. The use of such rotating disk-like data carriers, which are read optically, is, however, in no way restricted to record players. Videorecorders with optically scanned disks are also available. In one case we speak of audio disks and in the other of video disks.

The data carrier—the CD (CD stands for compact disk)—rotates at a speed that is relatively higher than that of a conventional record player. The information—sound, picture signals, or both for example—which are stored on the CD along a spiral or in concentric circles, is read out by means of an optical system in the reading head, which usually operates with lasers. The individual windings of the spirals or the individual concentric circles constitute the tracks.

The article, "The Compact Disk Digital Audio System," by X. G. Carasso, J. B. H. Peek, and J. P. Sinjou in Philips Technical Review, Vol. 40, No. 6 (1982) describes the design of a CD player.

The reading head must be accurately guided from track to track in order to scan the data carrier—the CD. In order to read out any desired data, it must also be possible to position the reading head precisely at any desired track. The reading head is guided and positioned by means of a controlled coarse drive mechanism and of a controlled fine drive mechanism that is mechanically connected to the coarse drive mechanism. The coarse drive mechanism can for example be a spindle driven by a servomotor that carries out the coarse positioning, whereas the fine drive mechanism, which entrained as a result of the mechanical connection, assumes the function of precise positioning. The coarse drive mechanism moves radially in relation to the center—the point of rotation, that is—of the rotating disk. The fine drive mechanism is mechanically mounted and is deflected by means of electromagnets such that the scanned beam of light is radially diverted to a prescribed extent out of the vertical both toward and away from the point of rotation. This deflection results in fine adjustment at the desired track.

FIG. 3 illustrates the system. A CD is driven by a motor M. The reading head, often called the optical scanning system or optical pick-up, is coarsely positioned by means of a spindle SP. A servomotor SM, which is governed by the same controls RG as the coarse drive mechanism, drives spindle SP. The controls RF for the fine drive mechanism also govern electromagnets EM that divert a beam L of light out of the vertical.

When tracks are being searched for, tracks that are not too remote from one another can be located with the fine drive mechanism. When, however, data are to be read out of a track that is farther away, the coarse drive mechanism must be activated. To keep access times brief the coarse drive mechanism must be guided over the tracks at high speed.

EPA 0 090 379 describes a device with a coarse drive mechanism and a fine drive mechanism for reading a rotating data carrier. The application mentions that high speeds on the part of the coarse drive mechanism can as a result of the inertia that occurs lead to undesired mechanical oscillations on the part of the fine drive mechanism, so that the fine drive-mechanism control loop can no longer engage. The fine drive-mechanism control loop is accordingly interrupted while the coarse drive mechanism is in operation. An acceleration signal generated by a device that measures acceleration and speed and corresponding to the instantaneous motion of the coarse drive mechanism is simultaneously supplied to the fine drive mechanism. The acceleration signal attenuates the mechanical oscillations of the fine drive mechanism to such an extent that the fine drive-mechanism control loop can engage even when the coarse drive mechanism is in operation.

At the commencement of the process of searching for a particular track, which will from now on be called the target track herein, the number of [tracks] etween the track just scanned, which will from now on be called the departure track herein, and the target track is determined. The tracks traveled by the fine drive mechanism will now be counted during the search process.

Low speeds on the part of the coarse drive mechanism during the search for the target track, speeds that occur in particular while the coarse drive mechanism is accelerating and braking, necessitate not only longer access times but also result as will be described later herein in errors in searching for a track due to the eccentricity of the disk and of the disk-drive mechanism. The aforesaid European application, however, does not discuss these errors.

Because the eccentricity of the both disk itself and of the disk-drive mechanism is very great in comparison to the distance between two adjacent tracks—approximately 200 to 300 to 300 as against 1.6 $\mu$m—one or more tracks that have already been traveled and accordingly counted can, when the coarse drive mechanism is operating at low speeds, be counted once or several times more because the coarse drive mechanism may travel over them two times or more in such cases. This will position the fine drive mechanism as it travels along with the coarse drive mechanism so far away from the target track that it will no longer be able to aim the beam of light at the target track.

One way of avoiding false positioning due to too low a speed on the part of the coarse drive mechanism is to establish what direction the coarse drive mechanism is actually travelling over the tracks in while the tracks are being counted by means of a special circuit called an orientation logical circuit. Since this solution, however, is expensive, it is reserved for the more costly equipment of the higher classes.

The coarse drive mechanism in the device disclosed in EPA 0 090 379 is uniformly accelerated until it arrives exactly between the departure track and the target track. Its speed accordingly increases linearly up to that point. Because the acceleration changes its mathematical sign while remaining constant in quantity at the midpoint between the departure track and the target track, the coarse drive mechanism is uniformly decelerated, and its speed will decrease linearly starting from the midpoint between the departure track and the target track and finally becoming zero when the coarse drive mechanism arrives at the target track. At the beginning and end of the path traveled by the coarse drive mechanism, in the vicinity of both the departure track and the target track, that is, its speed can be so low that the aforesaid errors due to the eccentricity of the disk and disk-drive mechanism can occur. To make it possible to reliably eliminate these errors the device disclosed in EPA 0 090 379 necessitates what is called an orientation logical circuit, which determines the direction that a track on the data carrier is actually being traveled over in. The orientation logical circuit and the device for measuring speed and acceleration increase the cost and accordingly make the equipment provided with the device disclosed in the European application more expensive.

SUMMARY OF THE INVENTION

The object of the present invention is accordingly to provide a method of searching for a track on a rotating disk-like data carrier that will allow rapid access times, that can be manufactured without expensive circuitry, especially an orientation logical circuit and a device for measuring the speed and acceleration of the coarse drive mechanism, and that will not be subject to errors due to the eccentricity of the rotating disk-like data carrier and its drive mechanism.

The invention attains this object in that the braking phase of the coarse drive mechanism is kept brief by means of powerful deceleration, in that a control signal is supplied to the coarse drive mechanism during the braking phase and attenuates mechanical oscillations on the part of the fine drive mechanism due to the inertia that occurs during braking, and in that the control loop remains disconnected at least while the control signal is being supplied to the fine drive mechanism.

DESCRIPTION OF THE PREFERRED EMBODIMENTS

Figure 2:
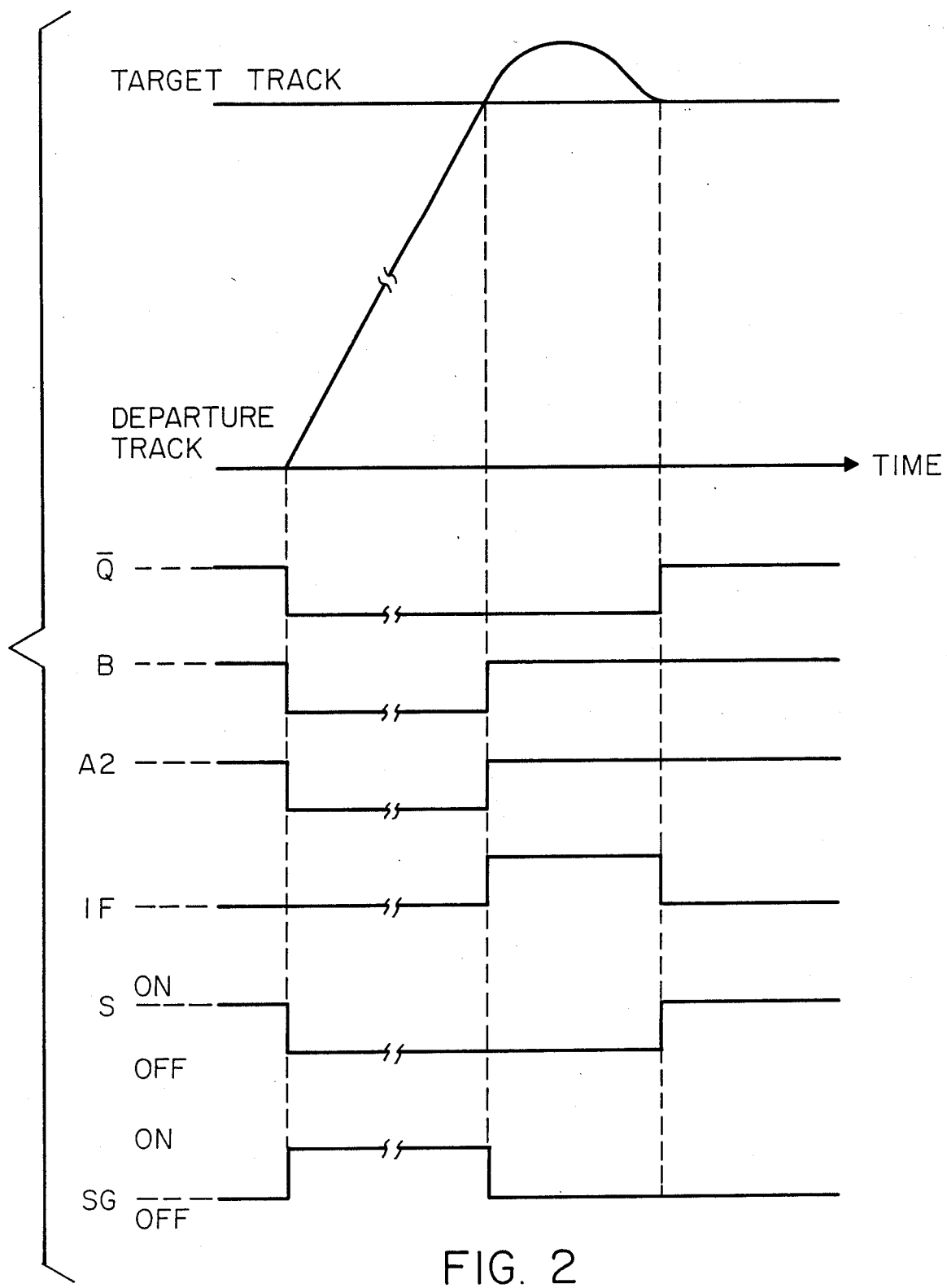
Figure 3:
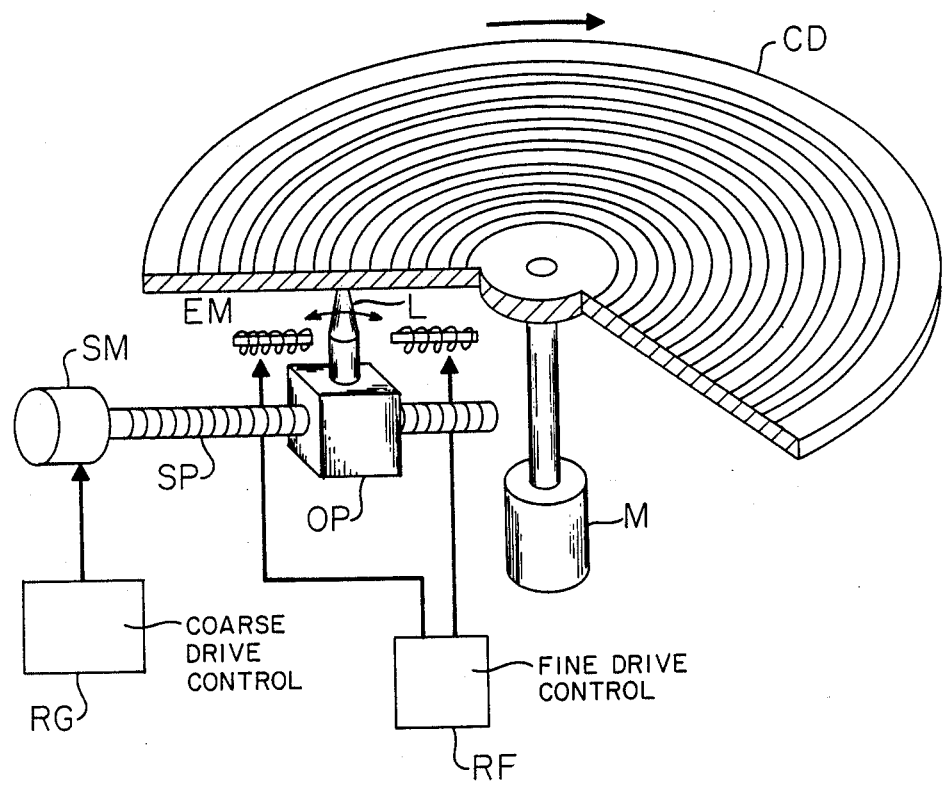
FIG. 3 is a perspective and schematic view of the essential elements, according to the present invention.

The invention will now be specified with reference to the graphs in FIG. 2.

The first graph in FIG. 2 illustrates the motion of the coarse drive mechanism from the departure track to the target track over time. When the coarse drive mechanism arrives at the target track or at a specific area in front of the target track, a control signal, which is illustrated in the seventh graph, brakes the mechanism very rapidly and with powerful deceleration. Simultaneously with this coarse drive-mechanism control signal, another control signal, illustrated in the fifth graph, is applied to the fine drive mechanism, the control loop of which is, as illustrated in the sixth diagram, off. The fine drive-mechanism control signal, which lasts no longer than the braking phase, powerfully attenuates mechanical oscillations on the part of the fine drive mechanism. The termination of the control signal at the fine drive mechanism is the criterion for switching on the fine drive-mechanism control loop, and the fine drive mechanism can now easily be controlled at the target track due to the powerful attenuation of its mechanical oscillations. The coarse drive mechanism can accordingly travel over the tracks at high speed while searching for a track and can be very rapidly braked with powerful deceleration in the vicinity of or at the target track. The result is not only brief access times while a track is being searched for but the elimination of errors due to the eccentricity of the disk-like data carrier and its drive mechanism.

Figure 1:
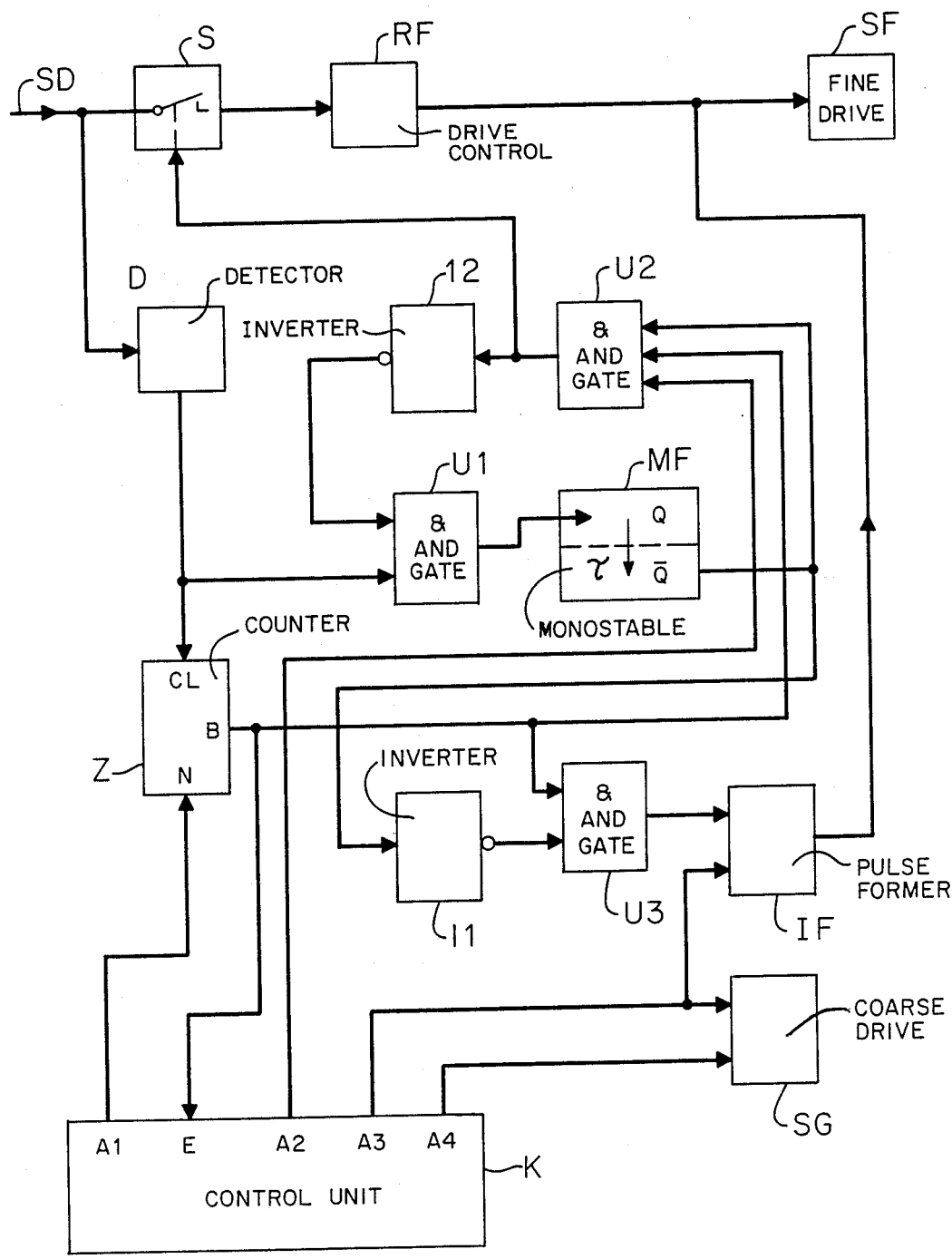
FIG. 1 is a circuit diagram illustrating how the method in accordance with the invention is carried out and FIG. 2 contains graphs of the motions of the coarse drive mechanism as a function of the control signals supplied to the fine drive mechanism and the coarse drive mechanism.

The circuitry for carrying out the method in accordance with the invention is not, as will now be specified with reference to the diagram in FIG. 1, complicated because it necessitates neither what is called an orientation logical circuit nor a device for measuring speed and acceleration.

A track-detection signal SD that indicates a leap from one track to the next is supplied to one contact of a variable switch S and to the input terminal of a detector D. The other contact of variable switch S is connected to the input terminal of fine drive-mechanism controls RF and the output terminal of controls RF is connected to the input terminal of a fine drive-mechanism adjusting component SF. The output terminal of detector D is connected to the synchronizing input terminal CL of a counter Z and to one input terminal of an AND gate U1. The output terminal of AND gate U1 is connected to the input terminal of a monostable flip-flop MF. The output terminal B of counter Z is connected to one input terminal of a second AND gate U2, to one input terminal of a third AND gate U3, and to one output terminal of a control unit K. The resetting input terminal N of counter Z is connected to one output terminal A1 of control unit K. Another output terminal A2 of control unit K is connected to the second input terminal of second AND gate U2. The third input terminal of AND gate U2 is connected to the $\overline{Q}$ output terminal of monostable flip-flop MF and to the input terminal of an inverter I1. The output terminal of inverter I1 is connected to the second input terminal of third AND gate U3. The output terminal of third AND gate U3 is connected to one input terminal of a pulse former IF. The output terminal of pulse former IF is connected to the input terminal of fine drive-mechanism adjusting component SF. The output terminal of second AND gate U2 is connected to the input terminal of another inverter I2 and to the control input terminal of variable switch S. The output terminal of second inverter I2 is connected to the second input terminal of first AND gate U1. The third output terminal A3 of control unit K is connected to the second input terminal of pulse former IF and to one input terminal of fine drive-mechanism adjusting component SF. The output terminal of second AND gate U2 is connected to the input terminal of second inverter I2 and to the control input terminal of variable switch S. The output terminal of second inverter I2 is connected to the second input terminal of first AND gate U1. The third output terminal A3 of control unit K is connected to the second input terminal of pulse former IF and to one input terminal of a coarse drive-mechanism adjusting component SG. The other input terminal of coarse drive-mechanism adjusting component SG is connected to the fourth output terminal A4 of control unit K.

The circuitry illustrated in FIG. 1 will now be specified with reference to the graphs illustrated in FIG. 2

The graphs illustrate the motion of the coarse drive mechanism and hence of the reading head from the departure track to the target track, the signal at the $\bar{Q}$ output terminal of monostable flip-flop MF, the signal at the output terminal B of counter Z, the signal at the second output terminal A2 of control unit K, the signal at the output terminal of pulse former IF, and the state of variable switch S and of coarse drive-mechanism adjusting component SG as a function of time.

It will initially be assumed that the device is in the normal state, with the fine drive mechanism being controlled at one track and the data being read out from that track. In this case the changes in track-detection signal SD are so slight that detector D will not respond, and accordingly releases a zero signal at its output terminal. The zero signal is supplied to the synchronizing input terminal CL of counter Z and to the first input terminal of first AND gate U1. Since counter Z accordingly receives no clock pulses, it remains in its zero state, in which it releases a logical 1 from its output terminal B. Since there is a logical 0 at the first input terminal of first AND gate U1, monostable flip-flop MF does not trip but remains, like counter Z, in its zero state. Thus there is a logical 1 at its $\bar{Q}$ output terminal and hence also at the third input terminal of second AND gate U2. Since the logical 1 from the output terminal B of counter Z is at the first input terminal of second AND gate U2 and since, during the operation now being specified, control unit K releases a logical 1 to the second input terminal of second AND gate U2, there will be a logical 1 at all three input terminals of second AND gate U2 and hence at its output terminal as well. This logical 1 closes variable switch S. With variable switch S closed, track-detection signal SD is supplied to fine drive-mechanism controls RF, which precisely guide the fine drive mechanism to the track by means of fine drive-mechanism adjusting component SF so that data can be read out. Because the logical 1 at the $\bar{Q}$ output terminal of monostable flip-flop MF blocks third AND gate U3 through first inverter I1, pulse former IF will not release any signal to the input terminal of fine drive-mechanism adjusting component SF.

How the circuit operates while a track is being searched for will now be specified.

It will be assumed for simplicity's sake that the target track is for example 100 tracks away from the departure track. Control unit K, through its first output terminal A1, charges counter Z to state 100 or to a state just below 100, 95 for example. Counter Z releases a logical 0 from its output terminal B. Control unit K releases, at its second output terminal A2, another logical 0 and, through its third output terminal A3 and fourth output terminal A4, switches on coarse drivemechanism adjusting component SG, which can for example be an electric motor. Due to the logical 0 at its first and second input terminals, second AND gate U2 also releases a logical 0 from its output terminal, opening variable switch S and disengaging fine drive-mechanism controls RF. Since there is now, because of second inverter I2, a logical 1 at the second input terminal of first AND gate U1, monostable flip-flop MF is set by the pulses from detector D, which releases a pulse every time one track on the data carrier is traveled. Since there is now a logical 0 at the $\bar{Q}$ output terminal of monostable flip-flop MF, all three input terminals of second AND gate U2 are at logical 0, whereas there is, because of first inverter I1, a logical 1 at the second input terminal of third AND gate U3. Every pulse released at the output terminal of detector D when a track is traveled over, reduces the state of counter Z by 1. The time constant $\tau$ of monostable flip-flop MF is large enough to prevent it from flopping back while the coarse drive mechanism is on and the target track is being searched for. In other words, the transition from one track to the next takes less time than the time constant $\tau$ of monostable flip-flop MF. Once the target track or the fifth track before the target track has been reached, the state of counter Z will, in relation to the numerical examples employed at this time, have dropped to zero. It will accordingly release a logical 1 at its output terminal B, causing control unit K to release a logical 1 at its second output terminal A2 and switching off the coarse drive mechanism, subsequent to which the braking procedure is initiated. The logical 1 at the output terminal B of counter Z also releases third AND gate U3. The logical 1 at its output terminal causes pulse former IF to release a control signal to fine drive-mechanism adjusting component SF, powerfully attenuating oscillations on the part of the fine drive mechanism due to the inertia that occurs during the braking of the coarse drive mechanism. Control unit K releases a signal from its third output terminal A3, causing the control signal at the output terminal of pulse former IF to ensure that the fine drive mechanism will always be deflected in a direction opposite the one that the coarse drive mechanism is moving in. If the coarse drive mechanism travels to the midpoint of the data carrier, the control signal at the output terminal of pulse former IF will deflect the fine drive mechanism away from the midpoint, whereas it will be deflected in the opposite direction—radially in—when the coarse drive mechanism moves away from the midpoint toward the edge of the disk. As long as the control signal from pulse former IF is supplied to fine drive-mechanism adjusting component SF, fine drive-mechanism control RF will remain out of action because variable switch S remains open due to the logical 0 at the output terminal of second AND gate U2. Because, during the braking of the coarse drive mechanism, the tracks will be traveled at constantly increasing intervals of time, the interval between two subsequent pulses released by detector D to counter Z and, through first AND gate U1, to monostable flip-flop MF will increase constantly until finally monostable flip-flop MF flops back into the zero state because the interval between two consecutive pulses is longer than the time constant $\tau$ of monostable flip-flop MF. The transition from one track to the next will now take longer than time constant $\tau$. The flopping back of monostable flip-flop MF will again produce a logical 1 at its $\bar{Q}$ output terminal instead of the logical 0. This logical 1 will, because of first inverter I1, block third AND gate U3 and produce a logical 1 again at the output terminal of second AND gate U2, closing variable switch S. The blocking of third AND gate U3 will prevent pulse former IF from continuing to release the control signal that attenuates the oscillations on the part of fine drive-mechanism adjusting component SF, whereas the closing of variable switch S will simultaneously reactivate fine drive-mechanism controls RF so that the fine drive mechanism can be guided to the target track that has been located. Counter Z and monostable flip-flop MF are now back in their original zero state because of a logical 1 at all three input terminals of second AND gate U2. While the fine drive mechanism is being guided to a track, the changes in track-detection signal SD will as aforesaid be so slight that detector D will not release any pulses to counter Z.

One particular advantage of the circuitry illustrated in FIG. 1 is that the fine drive mechanism will always be deflected by the control signal in a direction opposite the one that the coarse drive mechanism is moving in while the coarse drive mechanism is being braked. Since this backward motion on the part of the fine drive mechanism makes its speed in relation to the tracks on the disk lower than that of the coarse drive mechanism, the fine drive-mechanism control loop can be switched on earlier than if both drive mechanisms were operating at the same speed. Switching the fine drive-mechanism control loop on earlier abbreviates the access times.

A simpler circuit for carrying out the method in accordance with the invention is distinguished from the circuitry illustrated in FIG. 1 in that it has no pulse former IF and in that the output terminal of third AND gate U3 is directly connected to the input terminal of fine drive-mechanism adjusting component SF. In this circuit the fine drive mechanism is not always moved by the control signal in a direction opposite the one that the coarse drive mechanism is moving in but in the same direction as far as a mechanical stop.

Both circuits operate, in contrast to the device disclosed in EPA 0 090 379, without a device for measuring the acceleration and speed of the coarse drive mechanism. They do not need any orientation logical circuit to determine the direction that the reading head is actually traveling over the tracks in because the speed and acceleration of the coarse drive mechanism are high enough to prevent the initially described errors due to the eccentricity of the data carrier and its drive mechanism. Since the method in accordance with the invention can accordingly be realized at relatively low expenditure, the costs of manufacturing equipment, CD players for example, that operate with the method in accordance with the invention will be low.

The read-and-write head is in no way restricted to an optical scanning system. A capacitative, inductive, or other type of scanning system can also be employed.

I claim:

1. A method of searching for a track on a rotating disk-like data carrier with tracks that data can be written into and/or read out of by a read-and-write head that can be positioned over any track on the data carrier by a controlled coarse drive mechanism and a controlled fine drive mechanism that is mechanically connected to the coarse drive mechanism for reducing access time and reducing errors due to eccentricities in said data carrier and drive thereof, said method comprising the steps: braking the coarse drive mechanism over a relatively short interval by relatively high deceleration; supplying a control signal to the coarse drive mechanism during said braking step and damping mechanical oscillations of the fine drive mechanism due to inertia arising during said braking step; providing a control loop; and maintaining the control loop disconnected at least while the control signal is being supplied to the fine drive mechanism.

2. A method as defined in claim 1, wherein said control loop is reconnected and switched on when the relative speed between said fine drive mechanism and the tracks on the said data carrier exceeds a predetermined threshold.

3. A method as defined in claim 1, including the step of deflecting constantly said fine drive mechanism by said control signal during said brake in a direction opposite to movement of said coarse drive mechanism.

4. A method as defined in claim 1, including the step of deflecting said fine drive mechanism by said control signal during said braking as far as a mechanical stop.

5. An arrangement of searching for a track on a rotating disk-like data carrier with tracks that data can be written into and/or read out, comprising: a controlled coarse drive mechanism and a controlled fine drive mechanism mechanically connected to said coarse drive mechanism; a read-and-write head positionable over any track on the data carrier by said controlled coarse drive mechanism and said controlled fine drive mechanism; said coarse drive mechanism being braked over a relatively short interval by relatively high deceleration; means for supplying a control signal to said coarse drive mechanism during said braking and means for damping mechanism oscillations on said fine drive mechanism due to inertia arising during said braking; a control loop maintained disconnected at least while said control signal is supplied to said fine drive mechanism; a variable switch having a first contact supplied with a track-detection signal; a detector with an input also supplied with said track-detection signal; said variable switch having a second contact connected to an input of said fine-drive mechanism; a fine-drive mechanism adjusting component having an input connected to an output of said fine-drive mechanism; counting means having a synchronizing input connected to an output of said detector; a first AND gate having an input connected to the output of said detector; a monostable flip-flop having an input connected to an output of said first AND gate; said counting means having a resetting input and an output; a second AND gate having a first input connected to the output of said counting means; a third AND gate having an input connected to the output of said counting means; control means having an input connected to the output of said counting means; said control means having an output terminal connected to said resetting input of said counting means; said control means having another output connected to a second input of said second AND gate; said second AND gate having an input connected to an output of said monostable flip-flop; an inverter having an input connected to said output of said monostable flip-flop; said inverter having an output connected to another input of said third AND gate; said third AND gate having an output connected to an input of said fine-drive mechanism adjusting component; another inverter having an input connected to an output of said second AND gate; said variable switch having a control input connected to said output of said second AND gate; said control unit having a further output connected to an input of said coarse-drive mechanism adjusting component; said coarse-drive mechanism adjusting component having another input connected to a further output of said control means.

6. An arrangement of searching for a track on a rotating disk-like data carrier with tracks that data can be written into and/or read out of, comprising: a controlled coarse drive mechanism and a controlled fine drive mechanism mechanically connected to said coarse drive mechanism; a read-and-write head positionable over any track on the data carrier by said controlled coarse drive mechanism and said controlled fine drive mechanism; said coarse drive mechanism being braked over a relatively short interval by relatively high deceleration; means for supplying a control signal to said coarse drive mechanism during said braking and means for damping mechanical oscillations of said fine drive mechanism due to inertia arising during said braking; a control loop maintained disconnected at least while said control signal is supplied to said fine drive mechanism; a variable switch having a first contact supplied with a track-detection signal; a detector having an input supplied also with said track-detection signal; said variable switch having a second contact connected to an input of said fine drive mechanism; a fine drive mechanism adjusting component having an input connected to an output of said fine drive mechanism; counting means having a synchronizing input connected to an output of said detector; a first AND gate having one input connected to the output of said detector; a monostable flip-flop having an input connected to an output of said first AND gate; said counting means having a resetting input; a second AND gate having a first input connected to the output of said counting means; a third AND gate having an input terminal connected to said output of said counting means; control means having an input connected to the output of said counting means; said control unit having a first output connected to said resetting input of said counting means; said control unit having a second output connected to a second input of said second AND gate; said second AND gate having a third input connected to an output of said monostable flip-flop; an inverter having an input connected to said third input of said second AND gate; a third AND gate having an input connected to an output of said inverter; a pulse shaper having a first input connected to an output of said third AND gate; said pulse shaper having an output connected to the input of said fine drive mechanism adjusting component; another inverter having an input connected to the output of said second AND gate; said another inverter having an output connected to the second input of said first AND gate; said variable switch having a control input connected to the output of said another inverter; said control means having a third output connected to another input of said pulse shaper and to an input of said coarse drive mechanism adjusting component; said control means having a fourth output connected to another input of said coarse drive mechanism adjusting component.

* * * * *